United States Patent [19]
Medoff et al.

[11] Patent Number: 5,952,105
[45] Date of Patent: Sep. 14, 1999

[54] POLY-COATED PAPER COMPOSITES

[75] Inventors: Marshall Medoff, Brookline; Arthur Lagace, Newtonville, both of Mass.

[73] Assignee: Xyleco, Inc., Brookline, Mass.

[21] Appl. No.: 08/921,807

[22] Filed: Sep. 2, 1997

[51] Int. Cl.[6] ............................................. B32B 9/04
[52] U.S. Cl. ............................................ 428/411.1; 524/13
[58] Field of Search .............................. 428/411.1; 524/13

[56] References Cited

U.S. PATENT DOCUMENTS

| | | |
|---|---|---|
| 1,824,221 | 9/1931 | Mason . |
| 2,516,847 | 8/1950 | Boehm . |
| 3,516,953 | 6/1970 | Wood . |
| 3,718,536 | 2/1973 | Downs et al. . |
| 3,943,079 | 3/1976 | Hamed . |
| 4,112,038 | 9/1978 | Garner . |
| 4,113,908 | 9/1978 | Shinomura ............................. 428/113 |
| 4,204,010 | 5/1980 | Kramm ...................................... 427/44 |
| 4,244,847 | 1/1981 | Posiviata et al. ...................... 260/17.4 |
| 4,265,846 | 5/1981 | Shen et al. . |
| 4,279,790 | 7/1981 | Nakajima . |
| 4,559,376 | 12/1985 | Kubåt . |
| 4,608,922 | 9/1986 | Pöhl . |
| 4,632,170 | 12/1986 | Pöhl . |
| 4,717,742 | 1/1988 | Beshay . |
| 4,746,688 | 5/1988 | Bistak et al. . |
| 4,791,020 | 12/1988 | Kokta ...................................... 428/326 |
| 4,810,445 | 3/1989 | Lamb, Sr. et al. . |
| 4,818,604 | 4/1989 | Tock . |
| 4,874,095 | 10/1989 | Warych . |
| 4,963,603 | 10/1990 | Felegi, Jr. et al. . |
| 5,064,692 | 11/1991 | Hofmann ............................... 427/361 |
| 5,100,603 | 3/1992 | Neefe . |
| 5,124,519 | 6/1992 | Roy et al. . |
| 5,137,668 | 8/1992 | Lamb, Sr. . |
| 5,155,147 | 10/1992 | Dietz et al. . |
| 5,194,461 | 3/1993 | Bergquist et al. . |
| 5,254,617 | 10/1993 | Inoue ...................................... 524/433 |
| 5,284,610 | 2/1994 | Tai . |
| 5,298,102 | 3/1994 | Pohl . |
| 5,366,790 | 11/1994 | Liebel . |
| 5,372,878 | 12/1994 | Saito ...................................... 428/283 |
| 5,380,180 | 1/1995 | Lamb, Sr. . |
| 5,421,205 | 6/1995 | Pohl . |
| 5,437,766 | 8/1995 | Phan ...................................... 162/127 |
| 5,439,542 | 8/1995 | Liebel . |
| 5,441,801 | 8/1995 | Deaner et al. . |
| 5,480,602 | 1/1996 | Nagaich . |
| 5,516,472 | 5/1996 | Laver ...................................... 264/118 |
| 5,543,205 | 8/1996 | Liebel . |
| 5,574,094 | 11/1996 | Malucelli et al. . |
| 5,582,682 | 12/1996 | Ferretti . |
| 5,643,635 | 7/1997 | Ahn ...................................... 427/257 |

FOREIGN PATENT DOCUMENTS

| | | |
|---|---|---|
| A-47811/90 | 1/1989 | Austria . |
| 0 161 766 A1 | 11/1985 | European Pat. Off. . |
| WO 96/13468 | 5/1996 | WIPO . |
| WO 96/13551 | 5/1996 | WIPO . |

*Primary Examiner*—Paul R. Michl
*Attorney, Agent, or Firm*—Fish & Richardson P.C.

[57] ABSTRACT

Composites of poly-coated paper and a resin, and methods for forming the composites, are disclosed.

28 Claims, 1 Drawing Sheet

POLY-COATED PAPER COMPOSITES

BACKGROUND OF THE INVENTION

The invention relates to composites of poly-coated paper and a resin.

Paper coated with a polymer (poly-coated paper) is used in a number applications. For example, poly-coated paper is used to make a variety of food containers, including individual-serving size juice cartons and boxes for frozen foods.

Resins are also used in a variety of applications, for example, in food packaging. Food containers made of poly-coated paper or resins are typically used once, then discarded. As a result, there is an ever-increasing amount of waste poly-coated paper and resins.

SUMMARY OF THE INVENTION

In general, the invention features composites of texturized poly-coated paper and a resin.

The invention features a composite including at least about 2% by weight, more preferably at least about 5% by weight, texturized poly-coated paper, and a resin, such as a thermoplastic resin. The composite may also include cellulosic or lignocellulosic fiber.

The invention also features a composite that includes polyethylene and at least about 50% by weight texturized poly-coated paper.

The invention further features composites, including poly-coated paper and resin, that have flexural strengths of at least about 3,000 psi, or tensile strengths of at least about 3,000 psi.

In addition, the invention features a process for manufacturing a composite; the process includes shearing poly-coated paper to form texturized poly-coated paper, then combining the texturized poly-coated paper with a resin. A preferred method includes shearing the poly-coated paper with a rotary knife cutter. The invention also features a process for manufacturing a composite; the process includes shearing poly-coated paper and combining the poly-coated paper with a resin.

The term "texturized poly-coated paper" as used herein, means that the paper has been sheared to the extent that the internal fibers are substantially exposed. At least about 50%, more preferably at least about 70%, of these fibers, as well as the external polymer fibers, have a length/diameter (L/D) ratio of at least 10, more preferably at least 25, or at least 50. An example of texturized poly-coated paper is shown in FIG. 1.

The composites of the present invention are strong, lightweight, and inexpensive. The raw materials used to make the composites are readily available; for example, they may include discarded containers composed of resins, and discarded containers composed of poly-coated paper.

Poly-coated paper can be difficult to recycle because for many applications, the paper and the polymer layers must be separated. In the present invention, both the paper and the polymer portions are utilized, so there is no need to separate the two. The invention thus helps to recycle discarded post-consumer containers, while at the same time producing useful materials.

Other features and advantages of the invention will be apparent from the description of the preferred embodiments thereof, and from the claims.

DESCRIPTION OF THE PREFERRED EMBODIMENTS

Figure 1:
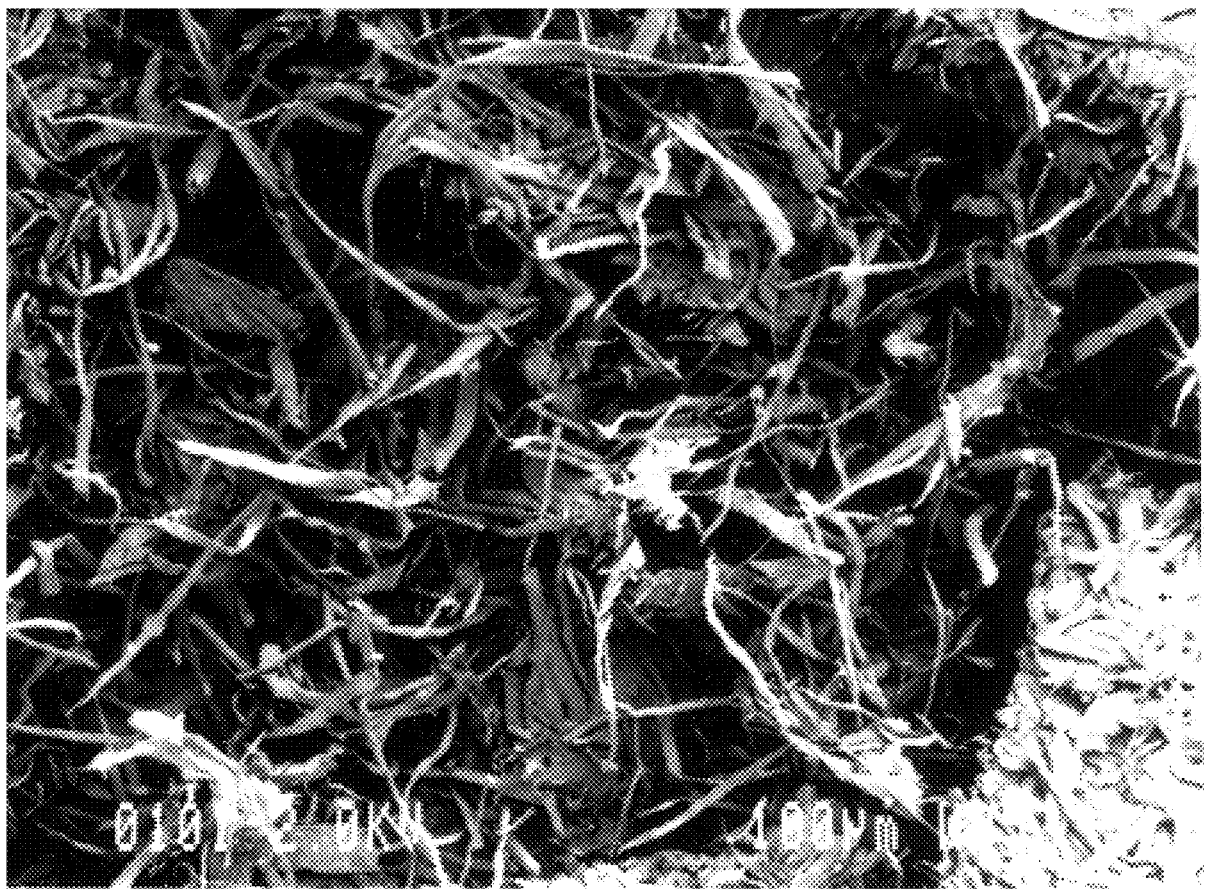
FIG. 1 is a photograph of an embodiment of texturized poly-coated paper, magnified 50 times.

A preferred composite includes texturized poly-coated paper and a resin.

The texturized poly-coated paper provides the composite with strength. The composite may include from about 30% to about 90%, more preferably from about 50% to about 70%, of the texturized poly-coated paper by weight. Examples of poly-coated paper include materials having layers of polymer and paper, and materials having layers of polymer, paper, and aluminum. A preferred poly-coated paper is one having layers of polymer and paper.

Poly-coated paper is available in a variety of forms. For example, whole sheets of virgin poly-coated paper can be purchased from International Paper, New York. Alternatively, scraps of poly-coated paper can be obtained from International Paper or other paper manufacturers. Used poly-coated paper, in the form of discarded food and beverage containers, can be gathered from various sources, including refuse bins. Used poly-coated paper can also be purchased from brokers of this material. If used poly-coated paper is included in the composites, it should be thoroughly washed before it is used. Scrap poly-coated paper is preferred, as it is less expensive than full sheets.

The resins encapsulate the texturized poly-coated paper and help control the shape of the composite. The resins also transfer the external loads to the poly-coated paper and protect the poly-coated paper from environmental and structural damage. Preferred composites include about 20% to about 60%, more preferably about 30% to about 50%, by weight of the resins.

Examples of resins include polyethylene (including, e.g., low density polyethylene and high density polyethylene), polypropylene, polystyrene, polycarbonate, polybutylene, thermoplastic polyesters, polyethers, thermoplastic polyurethane, PVC, Nylon, and other resins. It is preferred that the resins have a low melt flow index. Preferred resins include polyethylene and polypropylene with melt flow indices of less than 3 g/10 min, and more preferably less than 1 g/10 min.

The resins may be purchased as virgin material, or obtained as scrap or waste materials, and are usually purchased in pelletized form. Preferably, the resins are obtained as scrap or waste resins, as these materials are less expensive. A preferred source of resin is used polyethylene milk bottles.

The composites also include coupling agents. The coupling agents help to bond the hydrophilic fibers of the poly-coated paper to the hydrophobic resins. Examples of coupling agents include maleic anhydride modified polyethylenes, such those in the FUSABOND® (available from Dupont, Delaware) and POLYBOND® (available from Uniroyal Chemical, Connecticut) series. A preferred coupling agent is a maleic anhydride modified high density polyethylene such as FUSABOND® MB 100D.

The composites can also include cellulosic or lignocellulosic fibers. These fibers provide extra strength to the composite. The quantity of fiber which is incorporated into the composites can vary, depending on the desired physical and mechanical properties of the finished products. Preferred composites contain about 5% to about 50%, more preferably about 10% to about 30%, by weight of the cellulosic or lignocellulosic fiber. Examples of such fibers include paper and paper products, wood, wood fibers, and wood-related materials, as well as materials derived from kenaf, grasses, rice hulls, bagasse, cotton, jute, and other cellulosic or lignocellulosic materials. Preferred fibers include jute and kenaf. The fibers may have, for example, a L/D ratio of at least 10, or at least 25 or 50.

The composites can also contain additives known to those in the art of compounding, such as plasticizers, lubricants, antioxidants, opacificers, heat stabilizers, colorants, impact modifiers, photostabilizers, flame retardants, biocides, and antistatic agents.

Preparation of Starting Materials

If scrap poly-coated paper is used, it should be cleaned and dried. The poly-coated paper must then be texturized before it is combined with the resin. The poly-coated paper can be texturized using any one of a number of mechanical means, or combinations thereof. During the texturizing process, the polymer layers are sheared away from the paper layers, thus exposing the paper fibers. A preferred method of texturizing includes first cutting the poly-coated paper into ¼- to ½-inch pieces using a standard paper-cutting apparatus. These pieces are then sheared with a rotary cutter, such as the one (available from Sprout, Waldron Companies) described in Perry's Chem. Eng. Handbook, 6th Ed., at 8–29 (1984). The texturized material is then passed through a 2 mm mesh screen. The texturized poly-coated paper can be stored in sealed bags. It should be dried at approximately 105° C. for 4–18 hours (until the moisture content is less than about 0.5%) immediately before use. The Figure is an SEM photograph of the texturized poly-coated paper.

The resin may purchased in a pelletized or granulated form and used without further purification or drying. If surface moisture is present on the pelletized or granulated resin, however, it should be dried before use.

If cellulosic or lignocellulosic fibers are used, they can be texturized, using the process described above.

Preparation of Composites

The composites can be prepared as follows. A standard rubber/plastic compounding 2-roll mill is heated to 325–400° C. The resin (usually in the form of pellets or granules) is added to the heated roll mill. After about 10 minutes, the coupling agent is added to the roll mill. After another five minutes, the texturized poly-coated paper is added to the molten resin/coupling agent mixture. The texturized poly-coated paper is added over a period of about 10 minutes.

The composite is removed from the roll mill, cut into sheets and allowed to cool to room temperature. It is then compression molded into plaques using standard compression molding techniques.

Alternatively, a mixer, such as a Banbury internal mixer, is charged with the ingredients. The ingredients are mixed, while the temperature is maintained at less than about 190° C. The mixture can then be compression molded.

In another embodiment, the ingredients can be mixed in an extruder mixer, such as a MARIS (Turin) TM 85 extruder equipped with co-rotating screws. The resin and the coupling agent are introduced at the extruder feed throat; the poly-coated paper (and cellulosic or lignocellulosic fiber, if used) are introduced about ⅓ of the way down the length of the extruder into the molten resin. The internal temperature of the extruder is maintained at less than about 190° C. At the output, the composite is pelletized by cold strand cutting.

Alternatively, the mixture can first be prepared in a mixer, then transferred to an extruder for the extrusion and pellet-cutting steps.

In another embodiment, the composite can be formed into filaments for knitting, warping, weaving, and braiding, and to make non-wovens. In a further embodiment, the composite can be made into film.

Properties of the Composite

The resulting composites include a network of fibers, encapsulated within a resin matrix. The exposed fibers form a lattice network, which provides the composite with strength. Since the poly-coated paper is texturized, the amount of surface area available to bond to the resin is increased, in comparison to composites prepared with untexturized poly-coated paper. The resin binds to the surfaces of the exposed fibers, creating an intimate blend of the fiber network and the resin matrix. The intimate blending of the fibers and the resin matrix further strengthens the composites. Cellulosic or lignocellulosic fibers may also be added to strengthen the composite further.

Uses

The poly-coated paper/resin composites can be used in a number of applications. The composites are strong and light weight; they can be used, for example, as wood substitutes. The resin coating renders the composites water-resistant, so they may be used in outdoor applications. For example, the composites may be used to make pallets which are stored outdoors for extended periods of time. The composite also may be used, for example, as the base or carcass for a veneer product. Moreover, the composites when found can be surface treated, grooved, milled, shaped, imprinted, textured, compressed, punched, colored, etc. The surface may be made smooth or roughed.

EXAMPLES

The following examples were prepared as follows. A standard rubber/plastic compounding 2-roll mill was heated to 325–400° C. The resin (usually in the form of pellets or granules) was added to the heated roll mill. After about 10 minutes, the resin banded on the rolls (i.e., it melted and fused to the rolls). The coupling agent was then added to the roll mill. After another five minutes, the poly-coated paper was added to the molten resin/coupling agent mixture. The poly-coated paper was added over a period of about 10 minutes.

The composite was then removed from the roll mill, cut into sheets, and allowed to cool to room temperature. Batches of about 80 g each were compression molded into 6"×6"×⅛" plaques using standard compression molding techniques.

One composition contains the following ingredients:

| Composition No. 1 | |
| --- | --- |
| Ingredient | Amount (g) |
| High density polyethylene[1] | 160 |
| Poly-coated paper[2] | 240 |
| Coupling agent[3] | 8 |

[1] Marlex 6007, melt flow index 0.65 g/10 min, commercially available from Phillips
[2] Texturized using rotary cutter with 2 mm mesh
[3] POLYBOND ® 3009, commercially available from Uniroyal Chemical The plaques were machined into appropriate test specimens and tested according to the procedures outlined in the method specified. Three different specimens were tested for each property, and the mean value for each test was calculated.

The properties of Composition No. 1 are as follows:

| | |
| --- | --- |
| Tensile modulus ($10^5$ psi) | 8.63 (ASTM D638) |
| Tensile strength at break (psi) | 6820 (ASTM D638) |
| Ultimate elongation (%) | <5 (ASTM D638) |
| Flexural Strength (psi) | 12,200 (ASTM D790) |
| Flexural modulus ($10^5$ psi) | 6.61 (ASTM D790) |

Another composition contains the following ingredients:

Composition No. 2

| Ingredient | Amount (g) |
| --- | --- |
| High density polyethylene[1] | 160 |
| Poly-coated paper[2] | 240 |
| Coupling agent[3] | 8 |

[1] Scrapped milk jugs, melt flow index approximately 0.8 g/10 min
[2] Texturized using rotary cutter with 2 mm mesh
[3] POLYBOND ® 3009

The properties of Composition No. 2 are as follows:

Tensile modulus ($10^5$ psi) 7.38 (ASTM D638)
Tensile strength at break (psi) 6500 (ASTM D638)
Ultimate elongation (%) <5 (ASTM D638)
Flexural Strength (psi) 11,900 (ASTM D790)
Flexural modulus ($10^5$ psi) 6.50 (ASTM D790)
A third composition is as follows:

Composition No. 3

| Ingredient | Amount (g) |
| --- | --- |
| High density polyethylene[1] | 160 |
| Poly-coated paper[2] | 240 |
| Coupling agent[3] | 8 |

[1] Scrap milk jugs, melt flow index approximately 0.8 g/10 min
[2] Texturized using rotary cutter with 2 mm mesh
[3] FUSABOND ® MB 100D, commercially available from DuPont The properties of Composition No. 3 are as follows:

Tensile modulus ($10^5$ psi) 7.08 (ASTM D638)
Tensile strength at break (psi) 6480 (ASTM D638)
Ultimate elongation (%) <5 (ASTM D638)
Flexural Strength (psi) 10,200 (ASTM D790)
Flexural modulus ($10^5$ psi) 5.73 (ASTM D790)
A fourth composition contains the following ingredients:

Composition No. 4

| Ingredient | Amount (g) |
| --- | --- |
| High density polyethylene[1] | 160 |
| Poly-coated paper[2] | 240 |
| Coupling agent[3] | 8 |

[1] Marlex 6007, melt flow index 0.65 g/10 min
[2] texturized using rotary cutter with 2 mm mesh
[3] FUSABOND ® MB 100D The properties of Composition No. 4 are as follows:

| | |
| --- | --- |
| Tensile modulus ($10^5$ psi) | 7.17 (ASTM D638) |
| Tensile strength at break (psi) | 6860 (ASTM D638) |
| Ultimate elongation (%) | <5 (ASTM D638) |
| Flexural Strength (psi) | 12,200 (ASTM D790) |
| Flexural modulus ($10^5$ psi) | 7.50 (ASTM D790) |

Other embodiments are within the claims.

What is claimed is:

1. A composite comprising resin reinforced with at least about 2% polycoated paper that has been sheared to the extent that the internal fibers are substantially exposed.

2. The composite of claim 1, wherein at least about 5% by weight of the poly-coated paper is texturized.

3. The composite of claim 1, wherein the poly-coated paper comprises polyethylene and paper.

4. The composite of claim 3, wherein the poly-coated paper further comprises aluminum.

5. The composite of claim 1, wherein the resin is a thermoplastic resin.

6. The composite of claim 5, wherein the thermoplastic resin is polyethylene.

7. The composite of claim 5, wherein the thermoplastic resin is polypropylene.

8. The composite of claim 1, wherein the composite comprises about 50% to about 70% by weight poly-coated paper and about 30% to about 50% by weight resin.

9. The composite of claim 1, wherein the composite further comprises lignocellulosic fiber.

10. The composite of claim 1, wherein the composite further comprises cellulosic fiber.

11. A composite comprising polyethylene reinforced with at least about 2% poly-coated paper, wherein at least about 50% by weight of the poly-coated paper has been sheared to the extent that the internal fibers are substantially exposed.

12. A composite comprising resin reinforced with at least about 2% poly-coated paper, wherein the poly-coated paper has been sheared to the extent that the internal fibers are substantial exposed, and wherein the composite has a flexural strength of at least 3000 psi.

13. The composite of claim 12, wherein the composite has a flexural strength of at least 6000 psi.

14. The composite of claim 12, wherein the composite has a flexural strength of at least 10,000 psi.

15. A composite comprising resin reinforced with at least about 2% poly-coated paper, wherein the poly-coated paper has been sheared to the extent that the internal fibers are substantial exposed, and wherein the composite has a tensile strength of at least 3000 psi.

16. The composite of claim 15, wherein the composite has a tensile strength of at least 5,000 psi.

17. The composite of claim 15, wherein the composite has a tensile strength of at least 6,000 psi.

18. A process for manufacturing a composite comprising shearing poly-coated paper to the extent that its internal fibers are substantially exposed to form texturized poly-coated paper, and combining the texturized poly-coated paper with a resin.

19. The process of claim 18, wherein the resin is a thermoplastic resin.

20. The process of claim 18, wherein the step of shearing the poly-coated paper comprises shearing with a rotary knife cutter.

21. The composite of claim 1, wherein at least about 50% of the exposed internal fibers have a length/diameter ratio of at least 10.

22. The composite of claim 1, wherein at least about 50% of the exposed internal fibers have a length/diameter ratio of at least 25.

23. The composite of claim 1, wherein at least about 50% of the exposed internal fibers have a length/diameter ratio of at least 50.

24. The composite of claim 1, wherein at least about 70% of the exposed internal fibers have a length/diameter ratio of at least 50.

25. The composite of claim 11, wherein at least about 50% of the exposed internal fibers have a length/diameter ratio of at least 10.

26. The composite of claim 12, wherein at least about 50% of the exposed internal fibers have a length/diameter ratio of at least 10.

27. The composite of claim 15, wherein at least about 50% of the exposed internal fibers have a length/diameter ratio of at least 10.

28. The method of claim 18, wherein at least about 50% of the exposed internal fibers have a length/diameter ratio of at least 10.

\* \* \* \* \*